(12) United States Patent
Cho et al.

(10) Patent No.: US 7,696,027 B2
(45) Date of Patent: Apr. 13, 2010

(54) METHOD OF FABRICATING DISPLAY SUBSTRATE AND METHOD OF FABRICATING DISPLAY PANEL USING THE SAME

(75) Inventors: Woo-Sik Cho, Seoul (KR); Yun-Seok Lee, Cheonan-si (KR); Dong-Won Woo, Busan-si (KR); Ji-Hyeon Son, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 11/856,450

(22) Filed: Sep. 17, 2007

(65) Prior Publication Data

US 2008/0070332 A1 Mar. 20, 2008

(30) Foreign Application Priority Data

Sep. 18, 2006 (KR) .................. 10-2006-0090257

(51) Int. Cl.
*H01L 29/74* (2006.01)

(52) U.S. Cl. .................. 438/157; 438/149; 438/151; 438/48; 438/E27.111; 257/57; 257/72; 257/E21.314

(58) Field of Classification Search .............. 438/151, 438/149, 609, 155–158, 479, 517; 257/E27.116, 257/E29.117, E29.147, 57–59, 72, 347
See application file for complete search history.

(56) References Cited

U.S. PATENT DOCUMENTS

| 2006/0181665 A1* | 8/2006 | Hirota .................. 349/141 |
| 2007/0042136 A1* | 2/2007 | Ju et al. .................. 428/1.2 |
| 2007/0093005 A1* | 4/2007 | Kim et al. .................. 438/149 |
| 2007/0165179 A1* | 7/2007 | Jang .................. 349/156 |

FOREIGN PATENT DOCUMENTS

| JP | 2004061539 | 2/2004 |
| KR | 1020050063582 | 6/2005 |
| KR | 1020060013147 | 2/2006 |

\* cited by examiner

*Primary Examiner*—Dung A. Le
(74) *Attorney, Agent, or Firm*—H.C. Park & Associates, PLC

(57) ABSTRACT

Disclosed is a method of fabricating a display substrate. A black matrix and a color filter layer are formed on a base substrate, and then a transparent electrode and a photoresist layer pattern are sequentially formed. The transparent electrode is patterned using the photoresist layer pattern as a mask to form a common electrode, and a spacer is formed using the photoresist layer pattern.

16 Claims, 10 Drawing Sheets

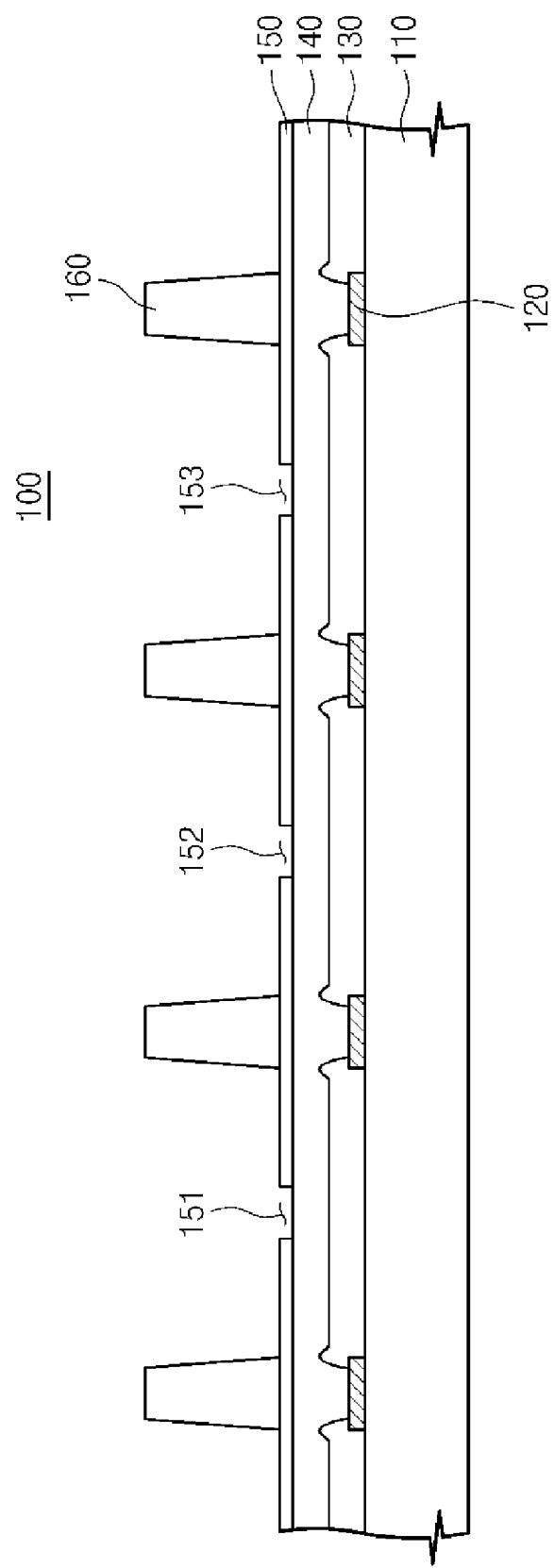

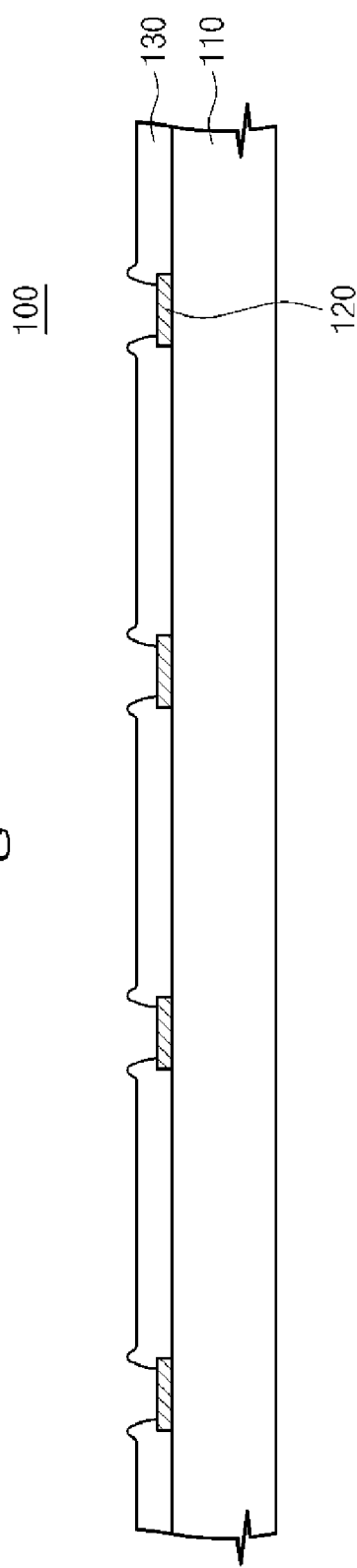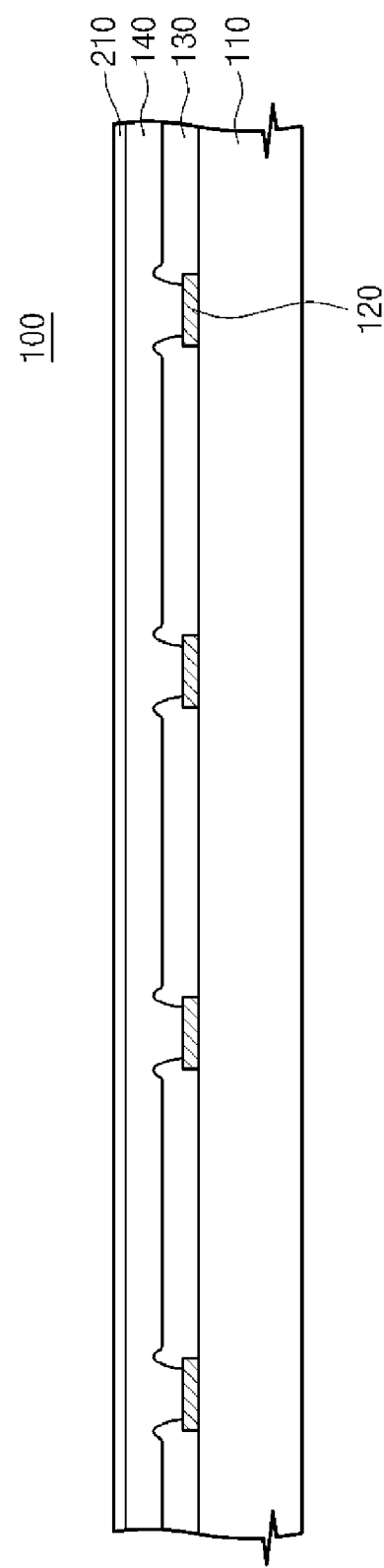

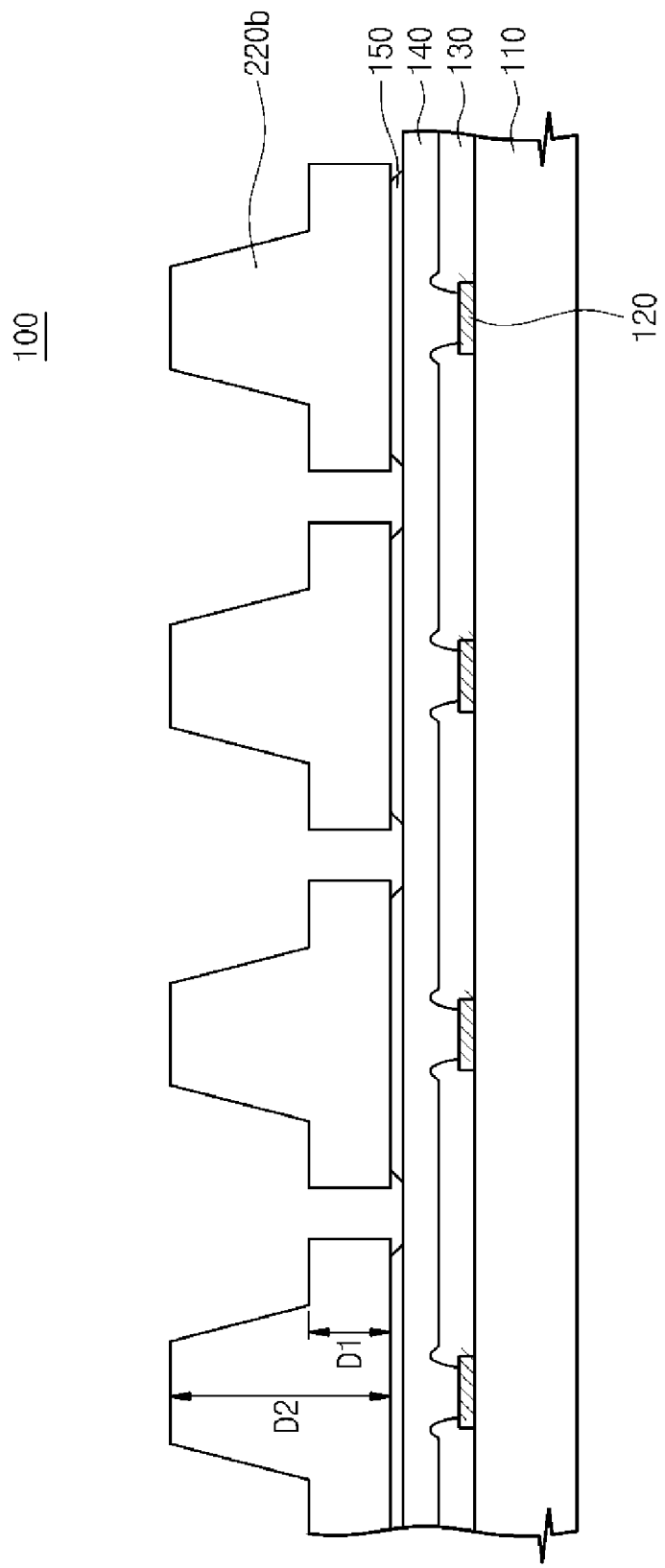

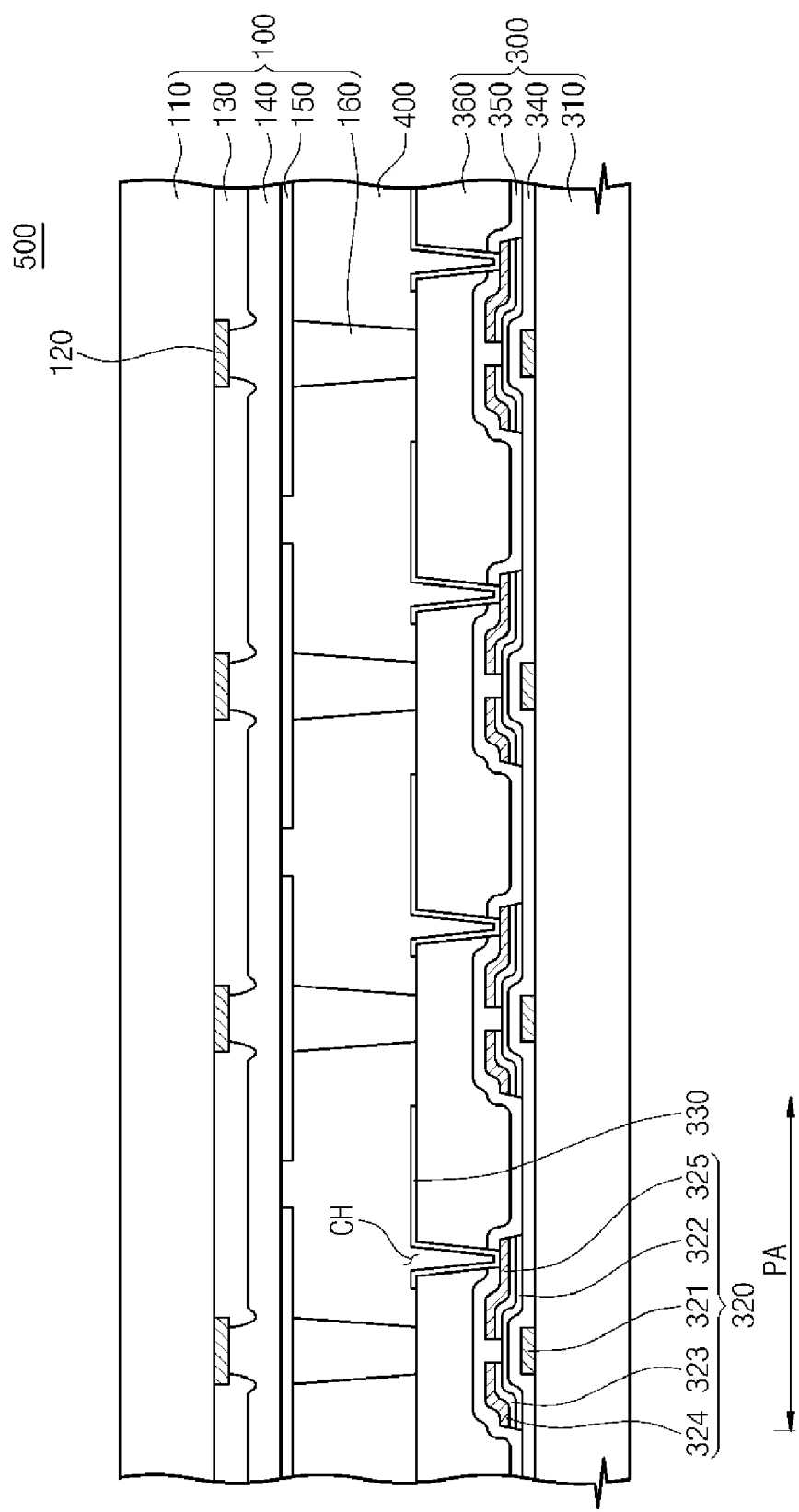

METHOD OF FABRICATING DISPLAY SUBSTRATE AND METHOD OF FABRICATING DISPLAY PANEL USING THE SAME

CROSS-REFERENCE TO RELATED APPLICATION

This application claims priority from and the benefit of Korean Patent Application No. 10-2006-0090257, filed on Sep. 18, 2006, which is hereby incorporated by reference for all purposes as if fully set forth herein.

BACKGROUND OF THE INVENTION

1. Field of the Invention

The present invention relates to a method of fabricating a display substrate and a method of fabricating a display panel using the same. More particularly, the present invention relates to a method of fabricating a display substrate, which may reduce manufacturing costs and improve productivity, and a method of fabricating a display panel using the same.

2. Discussion of the Background

In general, a liquid crystal display panel includes an array substrate, a color filter substrate facing the array substrate, and a liquid crystal layer interposed between the array substrate and the color filter substrate.

The array substrate includes a plurality of pixels which are basic elements representing an image. Each pixel is provided with a thin film transistor and a pixel electrode. The thin film transistor switches a pixel voltage applied to the liquid crystal layer. The pixel electrode is connected to a drain electrode of the thin film transistor and faces a common electrode formed on the color filter substrate, and the liquid crystal layer is interposed therebetween.

Such a liquid crystal display may be fabricated to have a slim size as compared to a cathode ray tube, but the liquid crystal display may have a narrower viewing angle.

Recently, in order to improve the viewing angle of the liquid crystal display, a Patterned Vertical Alignment (PVA) mode liquid crystal display panel and a Super-Patterned Vertical Alignment (SPVA) mode liquid crystal display panel have been developed. In the PVA mode liquid crystal display panel and the SPVA mode liquid crystal display panel, a plurality of domains are formed in a single pixel by patterning the pixel electrode and the common electrode, and the liquid crystal molecules of the liquid crystal layer are aligned differently in each domain. Accordingly, a step of patterning the common electrode is added to the fabrication process. Therefore, the number of masks and process steps needed to form the color filter substrate may increase, which may cause manufacturing costs to increase and productivity to decrease.

SUMMARY OF THE INVENTION

The present invention provides a method of fabricating a display substrate that may be capable of reducing manufacturing costs.

The present invention also provides a method of fabricating a display panel using the method of fabricating the display substrate.

Additional features of the invention will be set forth in the description which follows, and in part will be apparent from the description, or may be learned by practice of the invention.

The present invention discloses a method for fabricating a display substrate including forming a color filter layer on a base substrate and forming a transparent electrode on the color filter layer. A photoresist layer pattern is formed on the transparent electrode, and the transparent electrode is patterned using the photoresist layer pattern as a mask to form a common electrode. A spacer is formed using the photoresist layer pattern.

The present invention also discloses a method for fabricating a display panel including forming a color filter layer on a first base substrate and forming a transparent electrode on the color filter layer. A photoresist layer pattern is formed on the transparent electrode, and the transparent electrode is patterned using the photoresist layer pattern as a mask to form a common electrode. Then a spacer is formed using the photoresist pattern. A thin film transistor and a pixel electrode connected to the thin film transistor are formed on a second base substrate, and the first base substrate is coupled to the second base substrate while the first base substrate faces the second base substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 1 is a sectional view showing a color filter substrate according to an exemplary embodiment of the present invention.

FIG. 2A, FIG. 2B, FIG. 2C, FIG. 2D, FIG. 2E, and FIG. 2F are sectional views showing a process of manufacturing the color filter substrate shown in FIG. 1.

FIG. 3 is a sectional view showing a liquid crystal display panel according to an exemplary embodiment of the present invention.

DETAILED DESCRIPTION OF THE ILLUSTRATED EMBODIMENTS

Figure 2C:
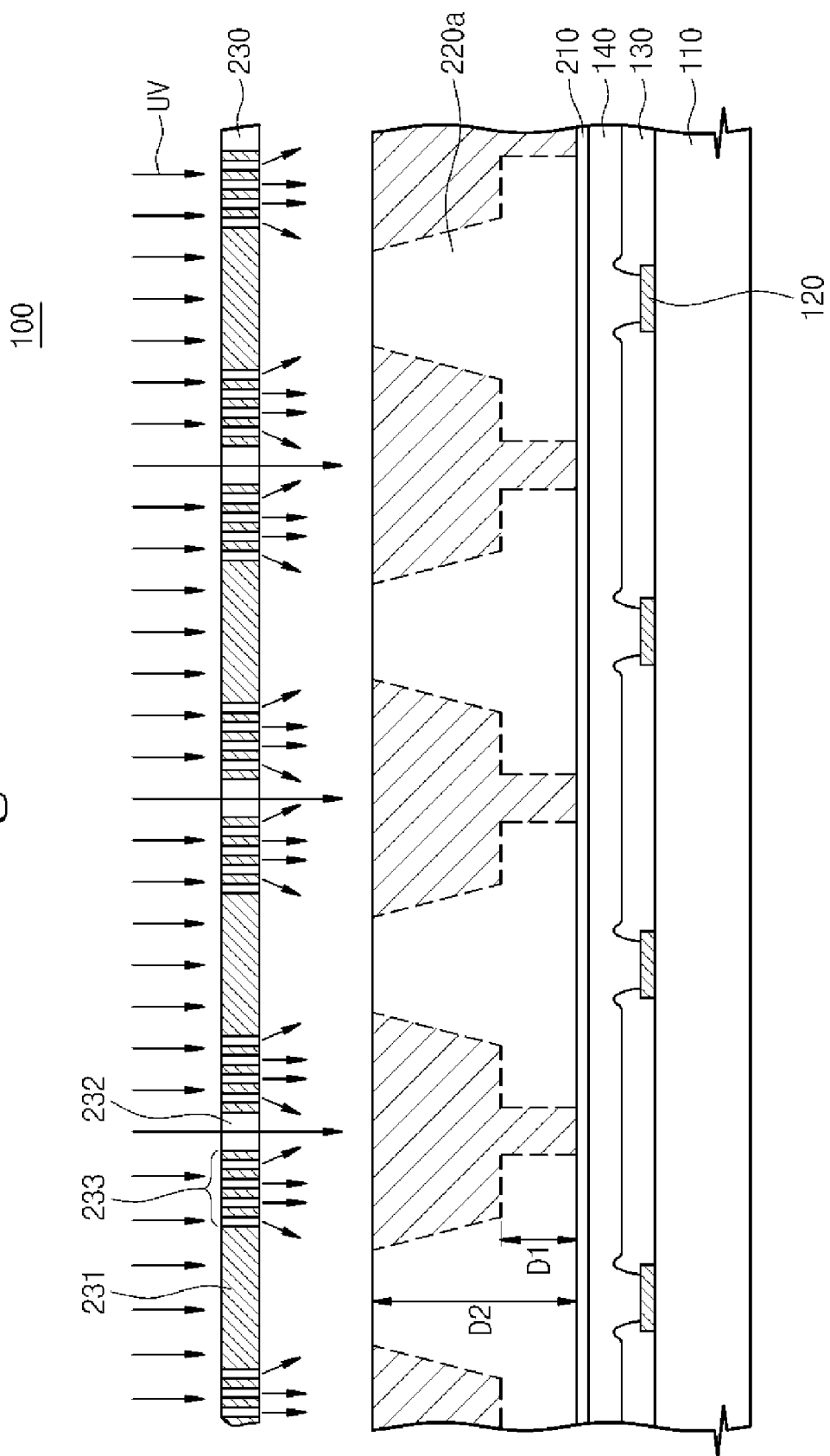

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is a sectional view showing a color filter substrate according to an exemplary embodiment of the present invention.

Referring to FIG. 1, the color filter substrate 100 includes a first base substrate 110, a black matrix 120, a color filter layer 130, an overcoat layer 140, a common electrode 150, and spacers 160.

The first base substrate 110 includes a transparent material, and the black matrix 120 is formed on the first base substrate 110. The black matrix 120 may include metal such as chrome (Cr) or chromium oxide ($Cr_2O_3$), or black organic material to block light.

The color filter layer 130 may be formed on the first base substrate 110, and may include a red color filter, a green color filter and a blue color filter. The red, green and blue color filters reveal predetermined colors using light, and the black matrix 120 surrounds the red, green and blue color filters.

The overcoat layer 140 may be formed on the black matrix 120 and the color filter layer 130 to planarize the color filter substrate 100. Here, when the black matrix 120 includes organic material, the overcoat layer 140 may be omitted.

The common electrode 150 may include a transparent conductive material such as Indium Tin Oxide (ITO) or Indium Zinc Oxide (IZO), and may be formed with a uniform thickness on the overcoat layer 140. The common electrode 130 may be partially removed to form openings 151, 152, and 153.

The spacers 160 are formed on the common electrode 150 and are spaced apart from each other. Each spacer 160 may have a predetermined height and include a photoresist material.

FIG. 2A, FIG. 2B, FIG. 2C, FIG. 2D, FIG. 2E, and FIG. 2F are sectional views showing a process of manufacturing the color filter substrate shown in the FIG. 1.

Referring to FIG. 2A and FIG. 2B, a black matrix 120 and a color filter layer 130 may be formed on a first base substrate 110, and then an overcoat layer 140 and a transparent electrode 210 may be sequentially formed thereon. The transparent electrode 210 may include a transparent conductive material such as ITO or IZO.

Figure 2D:
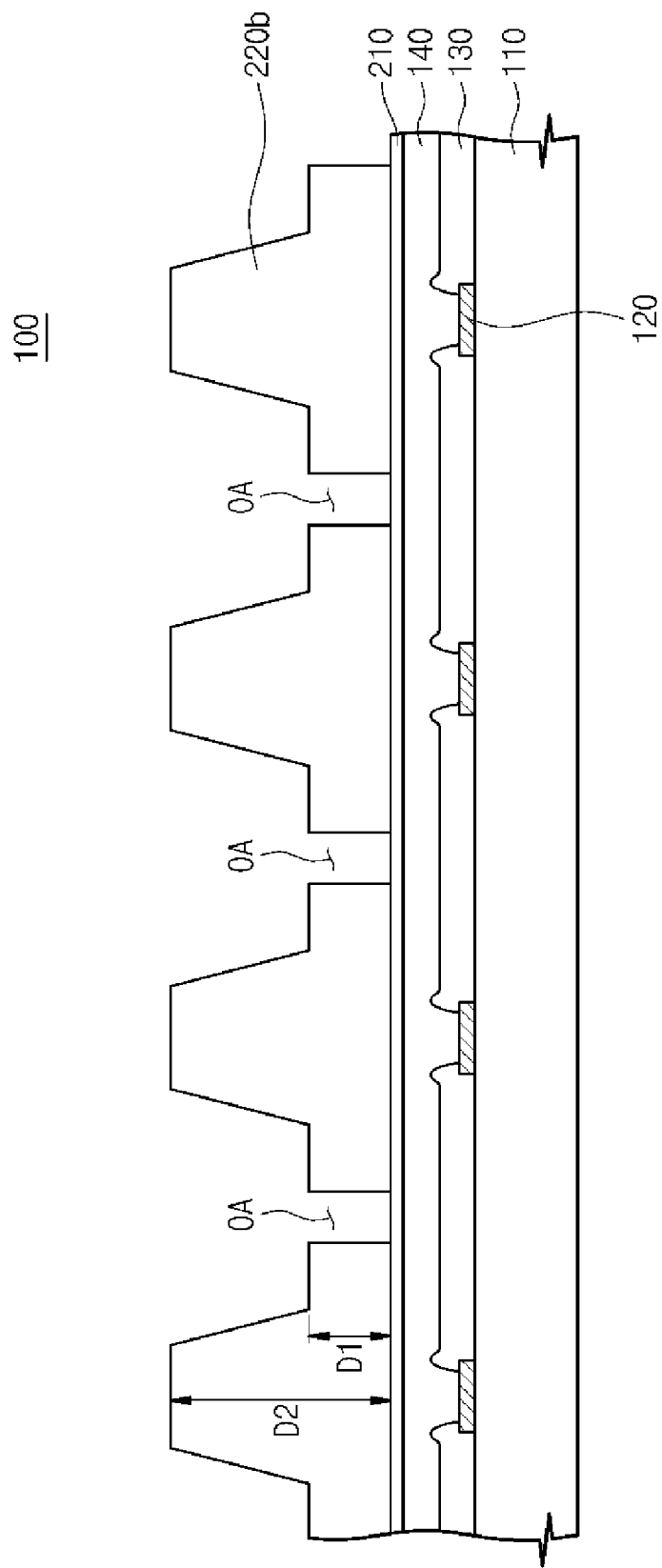

Referring to FIG. 2C and FIG. 2D, a photoresist layer 220a may be formed on the transparent electrode 210, and a slit mask 230 may be disposed above the photoresist layer 220a. As an example of the present invention, the photoresist layer 220a may be a positive type in which a region of the photoresist layer 220a that is exposed to ultraviolet rays (UV) is removed.

The slit mask 230 may be provided with at least one blocking portion 231 to block UV, at least one transmitting portion 232 to allow UV to pass therethrough, and at least one slit portion 233. The slit portion 233 is spaced apart from the photoresist layer 220a and includes alternating elongated transmitting areas, which UV may pass through, and elongated blocking areas, which UV may not pass through.

UV is irradiated on the slit mask 230 and the photoresist layer 220a is exposed to the UV. As shown in FIG. 2D, the photoresist layer 220a may be patterned through an exposure process using the slit mask 230 to form a photoresist pattern 220b. A region of the photoresist layer 220a corresponding to the blocking portion 231 is not removed, a region of the photoresist layer 220a corresponding to the transmitting portion 232 is removed, and a region of the photoresist layer 220a corresponding to the slit portion 233 is partially removed through the exposure process to reduce a thickness of the photoresist layer 220a.

Accordingly, the photoresist pattern 220b is formed with an opening area (OA) in a region corresponding to the transmitting portion 232 and has a first thickness D1 in a region corresponding to the slit portion 233, and has a second thickness D2, which is greater than the first thickness D1, in a region corresponding to the blocking portion 231. The transparent electrode 210 may be partially exposed through the opening area (OA).

Referring to FIG. 2A and FIG. 2E, the transparent electrode 210 may be patterned through a first etching process using the photoresist pattern 220b as a mask to form the common electrode 150. A region of the transparent electrode 210 exposed through the opening area OA is etched by etchant, and a region of the transparent electrode 210 covered with the photoresist pattern 220b is not etched.

Figure 2F:
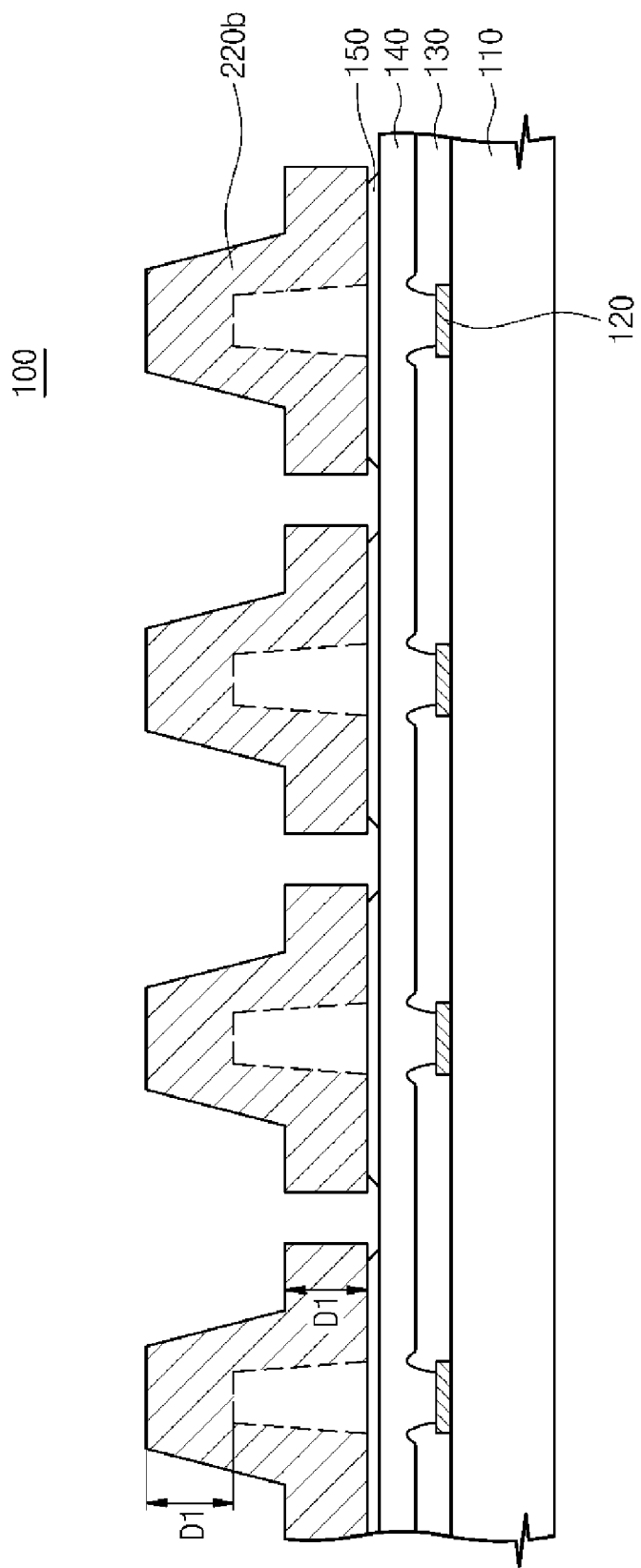

Referring to FIG. 1 and FIG. 2F, the photoresist pattern 220b may be partially removed through a second etching process to form the spacer 160. The entire region of the photoresist pattern 220b may be etched by the first thickness D1 through the second etching process. Accordingly, the region of the photoresist pattern 220b formed with the first thickness D1 by the slit mask 230 (shown in FIG. 2C) is removed, and the region of the photoresist pattern 220b formed with the second thickness D2 by the slit mask 230 is etched by the first thickness D1, thereby forming the spacer 160. Here, the spacer 160 may be formed on a region corresponding to the blocking portion 231 of the slit mask 230.

As described above, the common electrode 150 and the spacer 160 may be formed using the same photoresist layer 220a, instead of using different photoresist layers. Accordingly, the number of masks and process steps needed to form the color filter substrate 100 may be reduced, which may reduce manufacturing costs and improve productivity.

FIG. 3 is a sectional view showing a liquid crystal display panel according to an exemplary embodiment of the present invention.

Referring to FIG. 3, the liquid crystal display panel 500 includes an array substrate 300, a color filter substrate 100 facing the array substrate 300, and a liquid crystal layer 400 interposed between the array substrate 300 and the color filter substrate 100.

The array substrate 300 includes a second base substrate 310, a thin film transistor 320, and a pixel electrode 330.

The second base substrate 310 includes a plurality of pixel areas to display an image. Although not shown in drawings, the pixel areas are defined by a plurality of gate lines and a plurality of data lines that are insulated from the gate lines and cross the gate lines. The gate lines and the data lines are formed on the second base substrate 310.

A thin film transistor 320 and a pixel electrode 330 are formed in each pixel area (PA). The thin film transistor 320 includes a gate electrode 321 branched from the gate line, an active layer 322 and an ohmic contact layer 323 sequentially formed on the gate electrode 321, a source electrode 324 formed on an upper surface of the ohmic contact layer 323 and branched from the data line, and a drain electrode 325 formed on an upper surface of the ohmic contact layer 323 and connected to the pixel electrode 330.

The array substrate 300 further includes a gate insulating layer 340 formed on the second base substrate 310 and covering the gate electrode 321 and the gate lines, a protective layer 350 formed on the gate insulating layer 340 and covering the thin film transistor 320 and the data lines, and an organic insulating layer 360 formed on the protective layer 350. The protective layer 350 and the organic insulating layer 360 may be partially removed to form a contact hole CH exposing the drain electrode 325.

The pixel electrode 330 may include a transparent conductive material such as ITO or IZO, and is formed on the organic insulating layer 360 and connected to the drain electrode 325 through the contact hole CH. Although not shown in the drawings, the pixel electrode 330 may be partially removed and patterned to form domains in which the liquid crystal molecules of the liquid crystal layer 400 may be aligned in different directions.

Meanwhile, the color filter substrate 100 is coupled to the array substrate 300. In the present exemplary embodiment, the color filter substrate 100 has a structure identical to that of the color filter substrate 100 of FIG. 1 and may be formed by the same process. Therefore, the same reference numerals will be used to designate the same elements and the detailed description thereof will be omitted.

The color filter substrate 100 includes a first base substrate 110, a black matrix 120 and a color filter layer 130 formed on the first base substrate 110, an overcoat layer 140 formed on the black matrix 120 and the color filter layer 130, a common electrode 150 formed on the overcoat layer 140, and spacers 160 formed on the common electrode 150.

The black matrix 120 is formed in areas corresponding to the gate lines and the data lines so as to surround the pixel area PA. The red, green and blue color filters are formed on each pixel area. The common electrode 150 faces the pixel electrode 330 with the liquid crystal layer 400 interposed therebetween, and is partially removed to form a pattern. The liquid crystal display panel 500 is formed with domains in each pixel area PA according to the pattern of the common electrode 150 and a pattern of the pixel electrode 330. The liquid crystal molecules of the liquid crystal layer 400 are aligned in different directions in each domain.

The spacer 160 is interposed between the common electrode 150 and the array substrate 300 to maintain an interval between the color filter substrate 100 and the array substrate 300. The common electrode 150 and the spacer 160 may be formed using the same photoresist layer. Accordingly, the process for manufacturing a liquid crystal display panel 500 according to this exemplary embodiment of the present invention may reduce the number of masks and process steps, which may reduce manufacturing costs and improve productivity.

Figure 4:
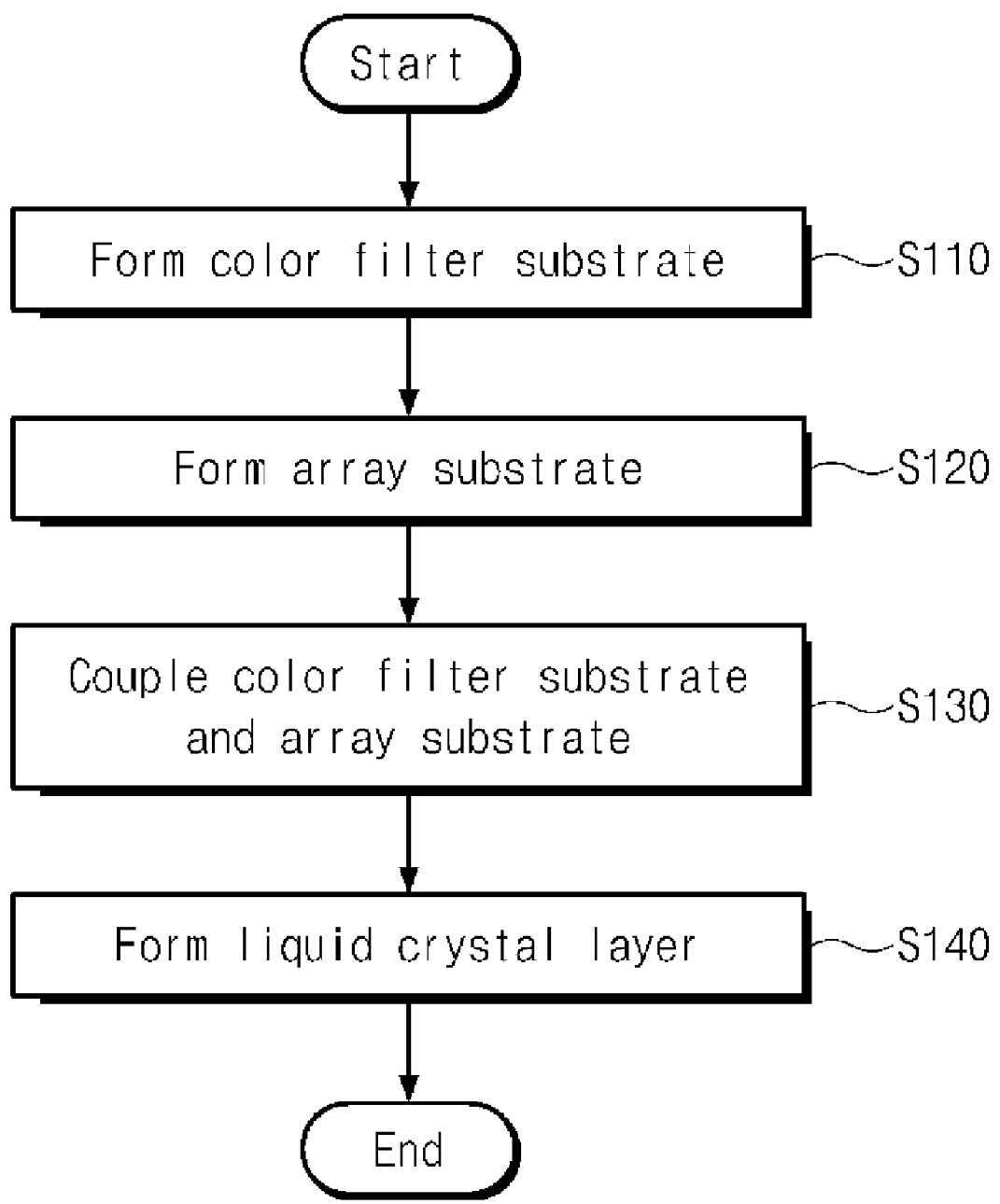
FIG. 4 is a flowchart showing a process of manufacturing the liquid crystal display panel shown in FIG. 3.

FIG. 4 is a flowchart showing a process of manufacturing the liquid crystal display panel shown in FIG. 3.

Referring to FIG. 3 and FIG. 4, the black matrix 120, the color filter layer 130, the overcoat layer 140, the common electrode 150, and the spacer 160 are formed on the first base substrate 110 to form the color filter substrate 100 (S110).

The thin film transistor 320, the pixel electrode 330, the gate insulating layer 340, the protective layer 350, and the organic insulating layer 360 are formed on the second base substrate 310 (S120). A process of forming the array substrate 300 will be explained in detail below with reference to FIG. 5A and FIG. 5B.

The color filter substrate 100 and the array substrate 300 are coupled to each other such that the color filter substrate 100 faces the array substrate 300 (S130), and the liquid crystal layer 400 is formed between the color filter substrate 100 and the array substrate 300 (S140). The liquid crystal layer 400 may be formed on one of the two substrates 100 and 300 before the color filter substrate 100 is coupled with the array substrate 300.

Figure 5A:
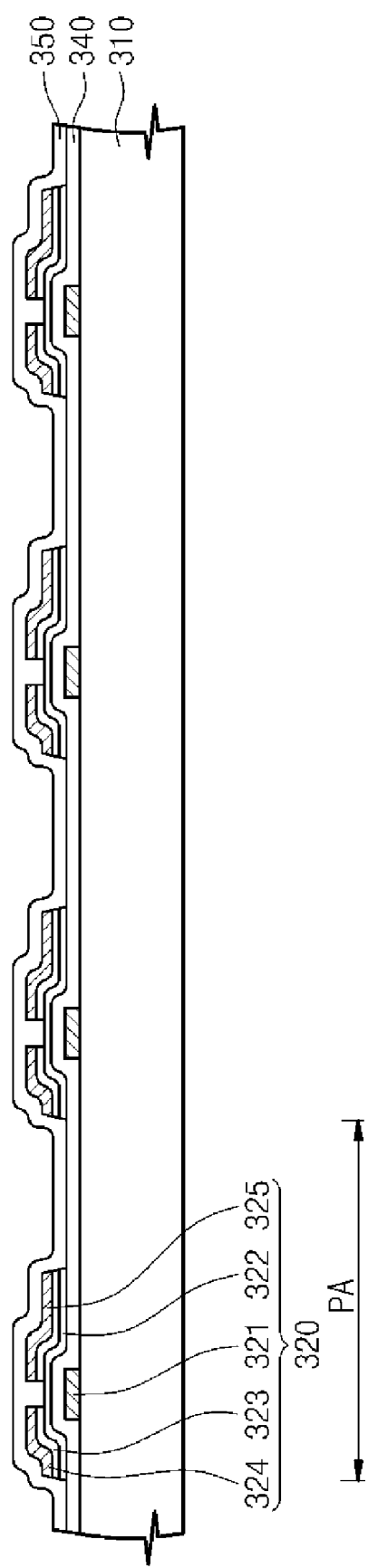
FIG. 5A and FIG. 5B are sectional views showing the manufacturing process of an array substrate shown in FIG. 3.
Figure 5B:
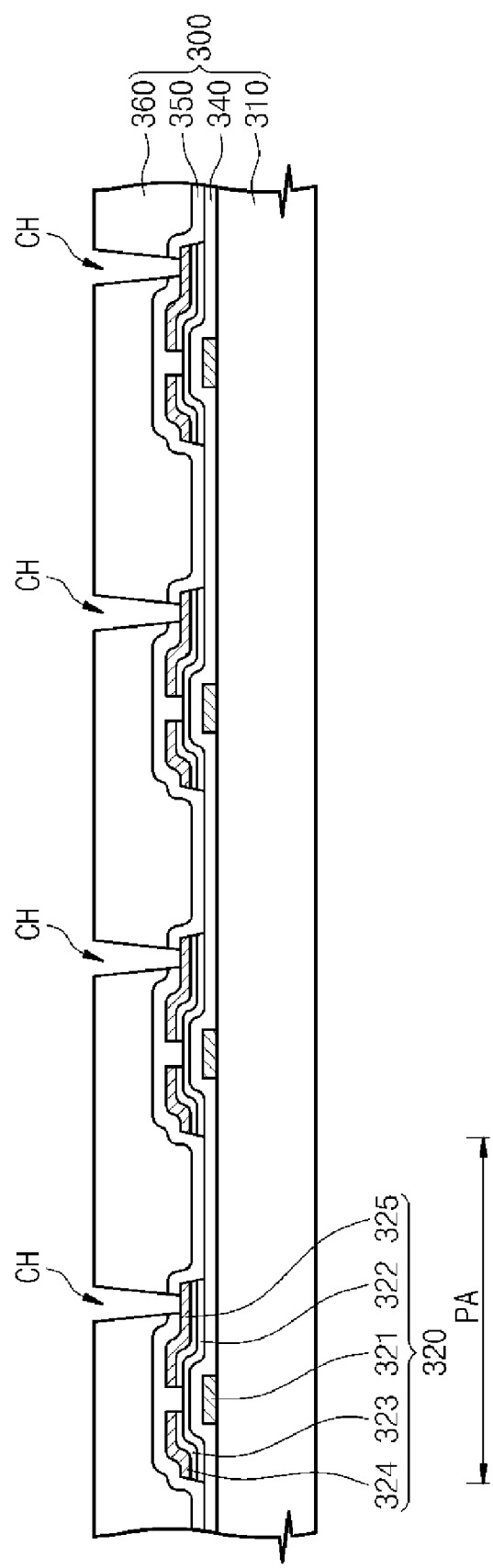

FIG. 5A and FIG. 5B are sectional views showing a manufacturing process of the array substrate shown in FIG. 3.

Referring to the FIG. 5A, the gate electrodes 321 are formed on pixel areas PA of the second base substrate 310, respectively, and the gate insulating layer 340 is formed thereon. After that, the active layer 322, the ohmic contact layer 323, the source electrode 324, and the drain electrode 325 are formed on the gate electrode 321. Accordingly, the thin film transistors 320 are formed on pixel areas PA, respectively. Then, the protective layer 350 is formed on the gate insulating layer 340 covering the thin film transistor 320.

Referring to FIG. 3 and FIG. 5B, the organic insulating layer 360 is formed on the protective layer 350, and then the protective layer 350 and the organic insulating layer 360 are partially removed to form the contact hole CH. After that, the pixel electrode 330 is formed on the organic insulating layer 360, thereby completing manufacture of the array substrate 300.

According to exemplary embodiments of the present invention, the common electrode and the spacer may be formed using the same photoresist layer, so the common electrode and the spacer may be formed using a single mask. Accordingly, the number of masks and process steps needed to form the color filter substrate may be reduced, which may reduce manufacturing costs and improve productivity.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a display substrate, the method comprising:
    forming a color filter layer on a base substrate;
    forming a transparent electrode on the color filter layer;
    forming a photoresist layer pattern on the transparent electrode;
    patterning the transparent electrode using the photoresist layer pattern as a mask to form a common electrode; and
    forming a spacer using the photoresist layer pattern.

2. The method of claim 1, wherein forming the photoresist layer pattern comprises:
    forming a photoresist layer on the transparent electrode;
    disposing a slit mask above the photoresist layer, the slit mask comprising a blocking portion which blocks light, a transmitting portion which allows light to pass therethrough and a slit portion which allows light to partially pass therethrough; and
    patterning the photoresist layer through an exposure process using the slit mask.

3. The method of claim 2, wherein the photoresist layer pattern has a first thickness in a first region corresponding to the slit portion, and is removed in a second region corresponding to the transmitting portion.

4. The method of claim 3, wherein the transparent electrode is patterned through a first etching process using the photoresist layer pattern as a mask.

5. The method of claim 4, wherein a portion of the transparent electrode, which is exposed in the second region, is removed through the first etching process.

6. The method of claim 5, wherein forming the spacer using the photoresist layer pattern comprises partially removing the photoresist layer pattern through a second etching process.

7. The method of claim 6, wherein the photoresist layer pattern is etched by the first thickness through the second etching process.

8. The method of claim 6, wherein the spacer is formed at a region corresponding to the blocking portion.

9. The method of claim 8, wherein the photoresist layer is a positive type, in which a region of the photoresist layer exposed to light is removed.

10. A method of fabricating a display panel, the method comprising:

forming a color filter layer on a first base substrate;
forming a transparent electrode on the color filter layer;
forming a photoresist layer pattern on the transparent electrode;
patterning the transparent electrode using the photoresist layer pattern as a mask to form a common electrode;
forming a spacer using the photoresist pattern;
forming a thin film transistor and a pixel electrode connected to the thin film transistor on a second base substrate; and
coupling the first base substrate to the second base substrate such that the first base substrate faces the second base substrate.

11. The method of claim 10, wherein forming the photoresist layer pattern comprises:
forming a photoresist layer on the transparent electrode;
disposing a slit mask above the photoresist layer, the slit mask comprising a blocking portion which blocks light, a transmitting portion which allows light to pass therethrough and a slit portion which allows light to partially pass therethrough above the photoresist layer; and
patterning the photoresist layer through an exposure process using the slit mask.

12. The method of claim 11, wherein the photoresist layer pattern has a first thickness in a first region corresponding to the slit portion, and is removed in a second region corresponding to the transmitting portion.

13. The method of claim 12, wherein the transparent electrode is patterned through a first etching process using the photoresist layer pattern as a mask.

14. The method of claim 13, wherein forming the spacer using the photoresist layer pattern comprises partially removing the photoresist layer pattern through a second etching process.

15. The method of claim 14, the spacer is formed at a region corresponding to the thin film transistor.

16. The method of claim 15, further comprising forming a liquid crystal layer between the first base substrate and the second base substrate.

* * * * *